(12) United States Patent
Sprenkle et al.

(10) Patent No.: US 7,351,491 B2
(45) Date of Patent: Apr. 1, 2008

(54) SUPPORTING ELECTRODES FOR SOLID OXIDE FUEL CELLS AND OTHER ELECTROCHEMICAL DEVICES

(75) Inventors: Vincent L. Sprenkle, Richland, WA (US); Nathan L. Canfield, Kennewick, WA (US); Kerry Meinhardt, Kennewick, WA (US); Jeffry W. Stevenson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 294 days.

(21) Appl. No.: 10/425,857

(22) Filed: Apr. 28, 2003

(65) Prior Publication Data

US 2008/0038611 A1 Feb. 14, 2008

(51) Int. Cl.
*H01M 4/00* (2006.01)
*H01M 8/10* (2006.01)

(52) U.S. Cl. .............................. 429/44; 429/30; 429/27

(58) Field of Classification Search .................... 429/44
See application file for complete search history.

(56) References Cited

U.S. PATENT DOCUMENTS

| | | | |
|---|---|---|---|
| 4,362,788 A | 12/1982 | Maru et al. | |
| 4,781,727 A | 11/1988 | Mitsuda et al. | |
| 4,910,100 A * | 3/1990 | Nakanishi et al. | ............ 429/32 |
| 4,920,015 A | 4/1990 | Sammells | |
| 4,952,466 A | 8/1990 | Cipriano et al. | |
| 5,026,601 A | 6/1991 | Iio | |
| 5,034,288 A | 7/1991 | Bossel | |
| 5,059,497 A | 10/1991 | Prince et al. | |
| 5,069,987 A | 12/1991 | Gordon | |
| 5,162,166 A | 11/1992 | Ellgen | |
| 5,230,849 A | 7/1993 | Hsu | |
| 5,441,822 A | 8/1995 | Yamashita et al. | |
| 5,702,837 A | 12/1997 | Xue | |
| 5,750,279 A * | 5/1998 | Carolan et al. | ................ 429/32 |
| 5,911,860 A | 6/1999 | Chen et al. | |
| 5,935,727 A | 8/1999 | Chiao | |
| 5,993,988 A | 11/1999 | Ohara et al. | |
| 6,183,609 B1 | 2/2001 | Kawasaki et al. | |
| 6,183,703 B1 | 2/2001 | Hsu et al. | |
| 6,187,157 B1 | 2/2001 | Chen et al. | |
| 6,228,520 B1 * | 5/2001 | Chiao | ........................... 429/32 |
| 6,332,964 B1 | 12/2001 | Chen et al. | |
| 6,475,657 B1 | 11/2002 | Del Gallo et al. | |
| 6,670,068 B1 * | 12/2003 | Diez | ........................... 429/35 |
| 2001/0003010 A1 | 6/2001 | Pham et al. | |
| 2002/0081475 A1 | 6/2002 | Simpkins et al. | |
| 2002/0086189 A1 | 7/2002 | Pham et al. | |
| 2002/0106548 A1 | 8/2002 | Chung et al. | |
| 2002/0119357 A1 | 8/2002 | Baldauf et al. | |
| 2002/0127344 A1 | 9/2002 | Pham et al. | |

(Continued)

*Primary Examiner*—Mark Ruthkosky
*Assistant Examiner*—Karie O'Neill
(74) *Attorney, Agent, or Firm*—Klarquist Sparkman, LLP (57) ABSTRACT

An electrode supported electrolyte membrane includes an electrode layer 630 facing an electrolyte layer 620. The opposing side of the electrode layer 630 includes a backing layer 640 of a material with a thermal expansion coefficient approximately equal to the thermal expansion coefficient of the electrolyte layer 620. The backing layer 640 is in a two dimensional pattern that covers only a portion of the electrolyte layer 630. An electrochemical cell such as a SOFC is formed by providing a cathode layer 610 on an opposing side of the electrolyte layer 620.

26 Claims, 10 Drawing Sheets

U.S. PATENT DOCUMENTS

| | | |
|---|---|---|
| 2002/0127455 A1 | 9/2002 | Pham et al. |
| 2002/0127456 A1 | 9/2002 | Pham et al. |
| 2002/0127459 A1 | 9/2002 | Lenz et al. |
| 2002/0127460 A1 | 9/2002 | Pham et al. |
| 2003/0096147 A1 | 5/2003 | Badding et al. |
| 2004/0121222 A1* | 6/2004 | Sarkar et al. ............... 429/45 |
| 2004/0202919 A1 | 10/2004 | Mardilovich et al. |

* cited by examiner

SUPPORTING ELECTRODES FOR SOLID OXIDE FUEL CELLS AND OTHER ELECTROCHEMICAL DEVICES

GOVERNMENT RIGHTS

This invention was made with Government support under Contract Number DE-AC0676RL01830 awarded by the U.S. Department of Energy. The Government has certain rights in the invention.

BACKGROUND

The present invention relates generally to the field of electrochemical devices, and more particularly but not exclusively to anode supported electrochemical cells and methods of fabrication. Materials and devices in accordance with the invention find advantageous use in solid oxide electrolyte electrochemical devices such as, for example, solid oxide fuel cells, electrolyzers, electrochemical sensors and the like.

As a background to the invention, electrochemical devices based on solid oxide electrolytes have received, and continue to receive, significant attention. For example, solid state oxygen separation devices have received significant attention for the separation of pure oxygen from air. In addition, electrochemical fuel cell devices are believed to have significant potential for use as power sources. Fuel cell devices are known and used for the direct production of electricity from standard fuel materials including fossil fuels, hydrogen, and the like by converting chemical energy of a fuel into electrical energy. Fuel cells typically include a porous fuel electrode (also referred to as the "anode"), a porous air electrode (also referred to as the "cathode"), and a solid or liquid electrolyte therebetween. In operation, gaseous fuel materials are contacted, typically as a continuous stream, with the anode of the fuel cell system, while an oxidizing gas, for example air or oxygen, is allowed to pass in contact with the cathode of the system. Electrical energy is produced by electrochemical combination of the fuel with the oxidant. Because the fuel cells convert the chemical energy of the fuel directly into electricity without the intermediate thermal and mechanical energy step, their efficiency can be substantially higher than that of conventional methods of power generation.

Figure 1:
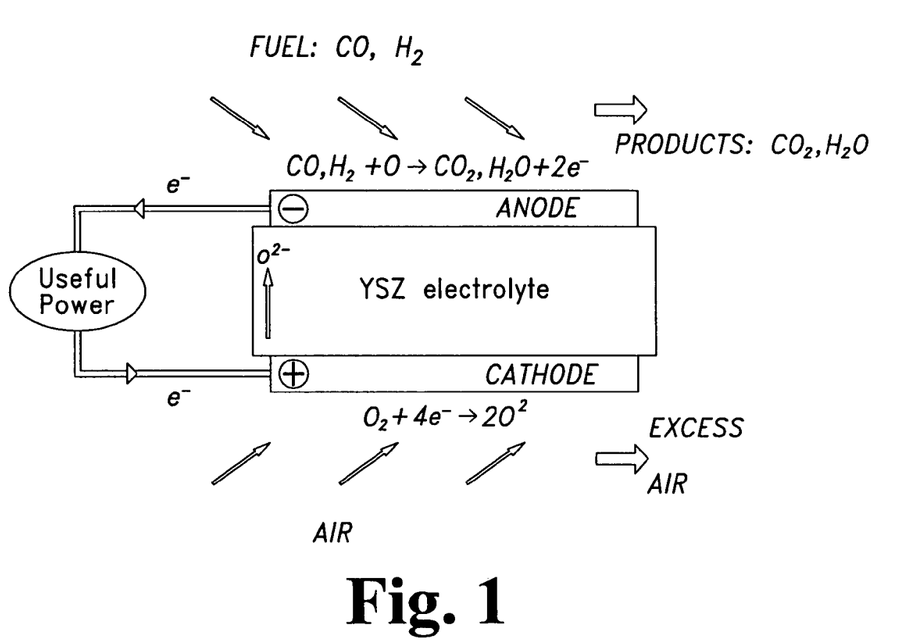
FIG. 1 depicts a general schematic diagram showing the function of a solid oxide fuel cell.

Solid oxide fuel cells (SOFCs) employing a dense ceramic electrolyte are currently considered as one of the most attractive technologies for electric power generation. In a typical SOFC, a solid electrolyte separates the porous metal-based anode from a porous metal or ceramic cathode. Due to its mechanical, electrical, chemical and thermal characteristics, yttria-stabilized zirconium oxide (YSZ) is currently the electrolyte material most commonly employed. At present, the anode in a typical SOFC is made of nickel-YSZ cermet, and the cathode is typically made of lanthanum manganites, lanthanum ferrites or lanthanum cobaltites. In such a fuel cell, an example of which is shown schematically in FIG. 1, the fuel flowing to the anode reacts with oxide ions to produce electrons and water. The oxygen reacts with the electrons on the cathode surface to form oxide ions that migrate through the electrolyte to the anode. The electrons flow from the anode through an external circuit and then to the cathode. The movement of oxygen ions through the electrolyte maintains overall electrical charge balance, and the flow of electrons in the external circuit provides useful power. Useful fuels for fuel cell power generation include, for example, hydrogen, carbon monoxide, methane and hydrazine.

Because each individual electrochemical cell made of a single anode, a single electrolyte, and a single cathode generates an open circuit voltage of about one volt and each cell is subject to electrode activation polarization losses, electrical resistance losses, and ion mobility resistant losses which reduce its output to even lower voltages at a useful current, a fuel cell assembly comprising a plurality of fuel cell units electrically connected to each other to produce the desired voltage or current is required to generate commercially useful quantities of power.

SOFCs typically operate at high temperatures, such as, for example, 650-1000° C. This allows flexibility in fuel choice and results in suitable fuel-to-electricity and thermal efficiencies; however, high temperatures impose stringent requirements on the materials selection for components of the fuel cell or fuel cell assembly. High operating temperatures also result in large thermal swings when the fuel cell is shut down and allowed to approach room temperature, either intentionally or accidentally. Because the different materials of the fuel cell invariably react differently to thermal cycling, i.e. they exhibit different thermal expansion coefficients; this thermal cycling can cause undesirable stress and lead to fluid leaks or structural breakdown.

Even larger thermal swings might be experienced by portions of the fuel cell during fabrication. For example, it is common to form portions of a fuel cell via a process which entails sintering at high temperatures, for example 1000-1400° C. In order to increase the overall efficiency of the fuel cell is it desirable to reduce the thickness of the electrolyte membrane. This is accomplished by co-sintering the thin (1-15 µm) electrolyte with one of the electrodes as the primary support. Thermal expansion mismatches between the electrolyte and the electrode materials can result in undesirable stresses at material interfaces and/or the development of warping or camber when cooling from these high temperatures. Moreover, it is often desirable or necessary to utilize a series of thermal treatments to fully assembly a fuel cell. For example, an individual cell might be formed by first constructing an electrolyte-anode membrane in the first co-sintering operation. Then a cathode layer is applied to the electrolyte membrane and finished in a second co-sintering step. Alternately the cathode may be fired during the same sintering operation as the anode-electrolyte layers.

Present efforts to develop commercially acceptable SOFCs that can be economically mass produced are hindered by the challenges presented by this thermal cycling and material property mismatch. For example, potential efficiencies to be gained through size reductions, for example by the construction of thin cells which utilize less materials and minimize gas diffusion distances, are offset by the need to overcome the challenges of thermal cycling.

Accordingly, it is apparent that there is a continuing need for further developments in the field of SOFC technology. In particular, there is a need for further advancement in the development of materials and techniques that are practical and cost-effective yet can withstand the rigorous demands of manufacturing and use in advanced SOFC designs. The present invention addresses this need, and further provides related advantages.

SUMMARY

The present invention relates generally to systems and methods for forming electrochemical devices, and in particular supported electrolytes. While the actual nature of the invention covered herein can only be determined with reference to the claims appended hereto, certain forms of the invention that are characteristic of the embodiments disclosed herein are described briefly as follows.

In one form of the present invention, an electrode supported electrolyte membrane for an electrochemical cell comprises a substantially continuous layer of a ceramic ion conducting electrolyte supported on a conductive electrode substrate, wherein the conductive electrode substrate is planar and has a thickness less than about 750 µm, and a backing structure on a face of the substrate opposite the electrolyte layer and composed of a material having a thermal expansion coefficient about equal to the thermal expansion coefficient of the ceramic ion conducting electrolyte and which prevents thermally induced deflection of the planar electrode substrate during processing.

It is one object of the present invention to provide improved systems and methods for use in constructing electrochemical devices.

Further objects, features, advantages, benefits, and further aspects of the present invention will become apparent from the drawings and description contained herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

The present invention provides novel oxide electrode materials and fabrication techniques for solid oxide electrochemical devices such as, for example, electrodes for electrolyzers, electrodes for electrochemical sensors and anodes for solid oxide fuel cells. The invention also provides novel methods for making electrodes for electrochemical devices and electrochemical devices and assemblies having electrodes comprising inventive compositions. The invention is described herein primarily by reference to solid oxide fuel cell (SOFC) technology, and a variety of examples are provided herein showing advantageous features and characteristics of the invention in relation to SOFC technology; however, it is not intended that the invention be limited to use in connection with SOFC devices.

It is well known to a person of ordinary skill in the relevant field that a SOFC can have a wide variety of configurations, including, for example and without limitation, a planar (also referred to as "flat plate") configuration, a tubular configuration and a corrugated configuration. The present invention is believed to address problems presented by material property mismatches, such as the mismatch in thermal expansion coefficient that leads to undesirable stresses and separations or cracking of layers in electrochemical devices. In the planar configuration presented and illustrated in the Figures, these problems are most noticeable and readily detectable, though not limited to, the development of undesirable warpage or camber of parts upon cooling from high temperatures. While the SOFC anode materials and methods provided by the present invention can be advantageously used in such planar configurations as a solution to the problem of camber development, it is to be understood that the anode materials can be used in a wide variety of SOFC configurations, and such are within the scope of the invention.

Figure 2:
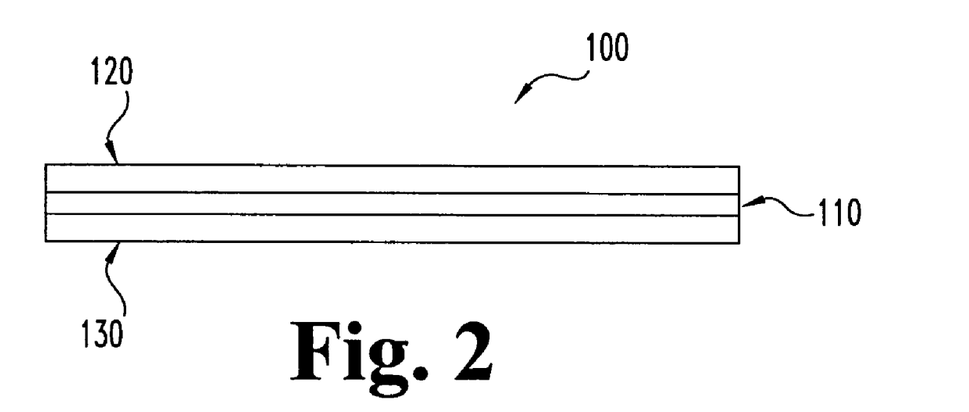
FIG. 2 is a schematic diagram of an embodiment of a fuel cell in accordance with the invention.

As known in the art, a fuel cell is generally of a three-layer configuration as shown schematically in FIG. 2, in which fuel cell 100 includes electrolyte layer 110, anode layer 120 and cathode layer 130. Anode layer 120 and cathode layer 130 are on opposite sides of the electrolyte layer 110.

A solid oxide fuel cell can be made in accordance with one aspect of the invention by first providing an anode substrate and then applying an electrolyte layer to the anode substrate to form an anode-electrolyte bilayer. A cathode layer is then applied to the electrolyte. A fuel cell made in such a manner is generally referred to as an "anode-supported" cell.

In other embodiments of the invention, a solid oxide fuel cell is made as an "electrolyte supported" or a "cathode-supported" fuel cell by using either the electrolyte or the cathode as the substrate to which the other layers are applied. In still other embodiments, particularly in methods for making fuel cells having a tubular construction, a porous inert substrate can be provided upon which each of the cathode, electrolyte and anode layers is sequentially applied.

One manner of making the anode-electrolyte bilayer for an anode supported SOFC is to independently form the anode substrate, for example, by tape casting, tape calendering or other method that would occur to a person of ordinary skill in the art, and then to apply the electrolyte layer to the anode substrate. The electrolyte can be similarly formed (i.e. tape cast) and laminated together with the anode or it can be applied to the anode by a different procedure, such as, for example, painting, spraying, dip coating, screen printing or colloidal filtration/sedimentation.

As described above, the electrolyte layer 110 is a ceramic ionic conductor material, such as yttria-stabilized zirconia (YSZ), or $ZrO_2$-8 mole % $Y_2O_3$, or any other material having similar properties. Several commercially available YSZ materials can be used including an HSY8.0 made by Daiichi and used in forming the bilayers of FIGS. 6 and 7.

The anode can be a nickel-YSZ cermet, which is composite mixture of the ceramic ionic conductor and an electric conductor. Generally, the nickel is provided in the form of NiO in the cermet and is subsequently converted to Ni by exposure to a reducing environment. The amount of Ni in the anode layer 120 is sufficient to enable electrical conduction and performance of the electrochemical reaction and typically ranges from about 30-60 volume % solids after reduction, for example about 40 volume % of the anode layer 120 after reduction. In one aspect, the anode layer 120 is formed as a multi layer structure, having an active anode layer supported on a bulk anode layer, with the active anode layer facing the electrolyte layer. While the active and bulk anodes can be identical, because it serves primarily as a support substrate, the composition of the bulk anode layer may vary from that of the active anode. For example, the bulk anode may have a lower amount of Ni, such as about 40% by solids volume and be formed with a lower grade YSZ, for example a 5 mole % yttria composition.

As known in the art, anode and electrolyte materials can be tape cast by milling particles of the respective material (YSZ alone or YSZ and NiO) to a suitable particle size, such as approximately 0.1-5.0 μm, and forming a slurry with a suitable solvent, dispersant, binder and plasticizer. A suitable solvent is a mixture of Methyl ethyl ketone and ethanol. A suitable dispersant and binder is PS-21A from Witco and polyvinyl butyl (Butvar 79) from Solutia. A suitable plasticizer is Sanitizer S-160 from Monsanto. Upon drying, the individual layers of tape can be roll laminated between heater rollers. Suitable laminating conditions are 95-115° C. at 30 psi.

Figure 4:
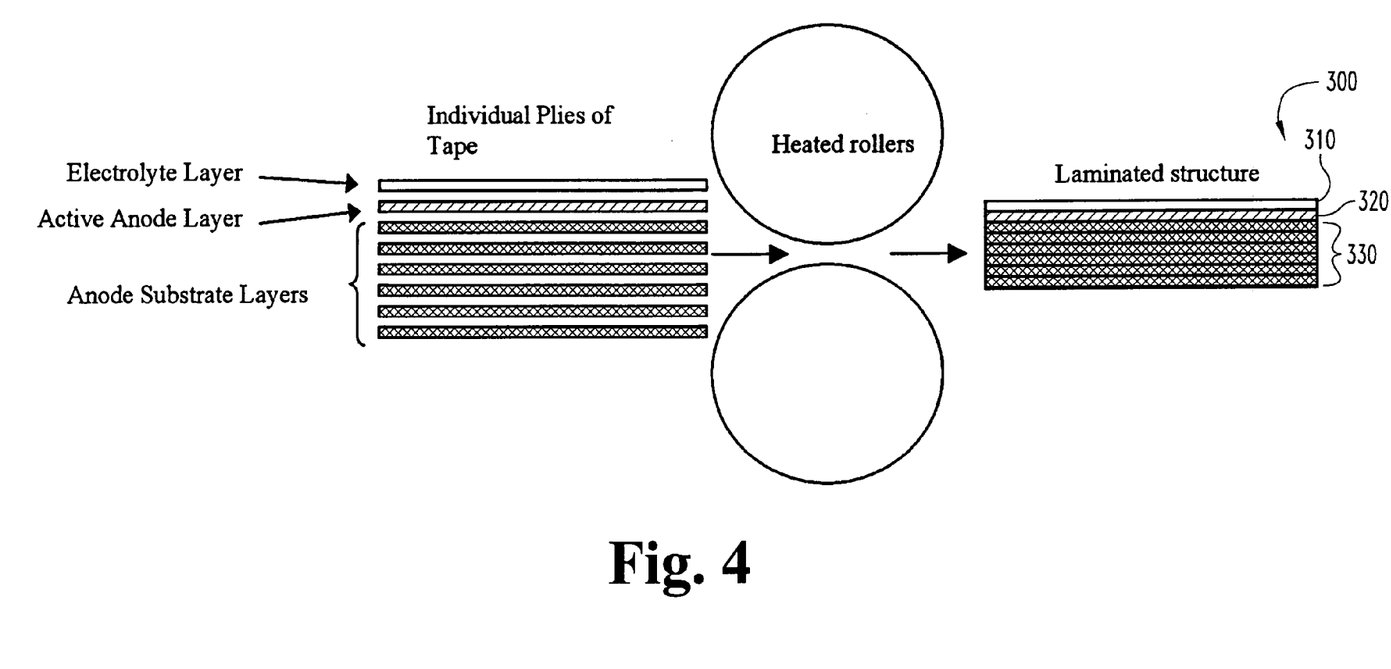
FIG. 4 is a schematic diagram of the roll lamination process used in the construction of anode-electrolyte bilayers.

As illustrated in FIG. 4, one technique utilizes single tape sheets of electrolyte and active anode and a number of tape sheets of the bulk anode to form a single laminated anode-electrolyte bilayer 300 which has a relatively thin electrolyte layer 310 on a relatively thin active anode layer 320 all supported on a more substantial bulk anode layer 330. The laminated anode-electrolyte bilayer 300 is then sintered, for example at 1375° C. for 1 hour.

After sintering the layer of electrolyte 310 in bilayer 300 preferably has a thickness between 3 and 30 μm, for example between 5 and 15 μm, or about 8 μm. The active anode 320 in bilayer 300 preferably has a thickness between 3 and 30 μm, for example between 5 and 15 μm, or about 8 μm. The bulk anode 330 in bilayer 300 preferably has a thickness between 200 and 1000 μm, for example between 400 and 600 μm, or about 550 μm.

As the layers become thinner, and particularly when the bilayer 300 is less than about 750-1000 μm after sintering, the effects of material property mismatch begin to manifest in the development of camber. For example, FIG. 6 illustrates a cambered 144×98 cm bilayer 300 at room temperature after sintering at 1375° C. for 1 hour.

Figure 5:
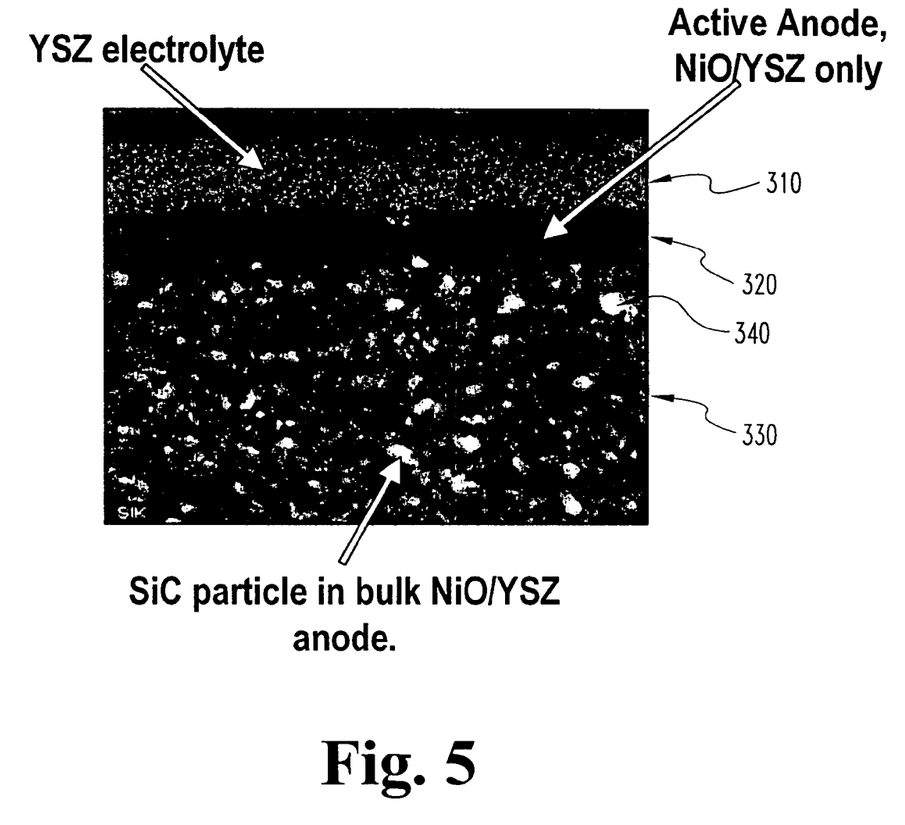
FIG. 5 is a scanning electron micrograph showing the microstructure of an anode-electrolyte bilayer with SiC particles in the bulk anode.

Surprising, it has been found that a relatively small amount of silicon carbide, SiC, added to the anode dramatically reduces the formation of camber, and accordingly, in one aspect of the invention, the composite mixture of the anode includes an amount of SiC sufficient to substantially reduce or eliminate this room temperature camber. The amount of SiC in the anode layer 120 can be any effective amount, but it will typically range from about 1 to about 20 volume % solids of the anode layer 120 after reduction, which corresponds to about 0.5 to about 10% by weight. The SiC can be added to a particular anode layer, for example the bottom-most anode substrate layer of the individual piles of tape in FIG. 4, or more preferably the SiC is generally evenly dispersed through a substantial portion of the bulk anode layer 330, for example being evenly dispersed throughout substantially all of the bulk anode layer 330. When evenly dispersed throughout the bulk anode layer 330 a concentration in the lower end of the range may be employed, for example from 0.5 to 5% by weight. An exemplary scanning electron micrograph of a SiC modified bilayer is depicted in FIG. 5 wherein it can be seen that the SiC particles are generally evenly dispersed throughout the bulk anode layer 330.

One method of adding the SiC is to mix it in with the NiO and YSZ in either powder or fiber form prior to tape casting. A suitable particle size for the SiC corresponds to the particle size of the NiO and YSZ particles. Alternatively, the SiC ranges in average size between about 0.1 and 10 μm, for example having a mean size less that 1.0 μm, such as 0.4 μm. Commercial available SiC particles can be used, for example obtained from Superior Graphite, and they can be attrition milled to the desired average size.

Figure 6:
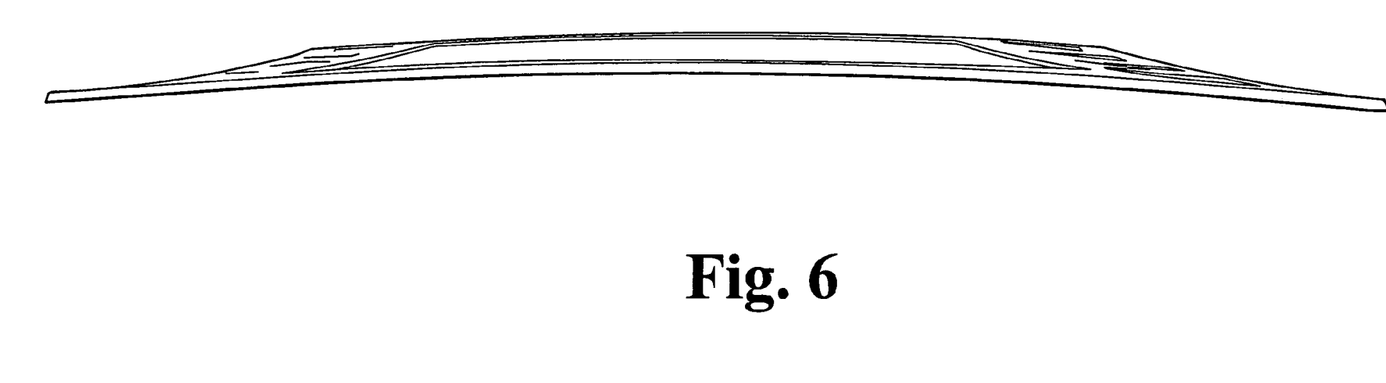
FIG. 6 is a picture of an anode-electrolyte bilayer at room temperature after sintering illustrating the undesirable formation of camber.
Figure 7:
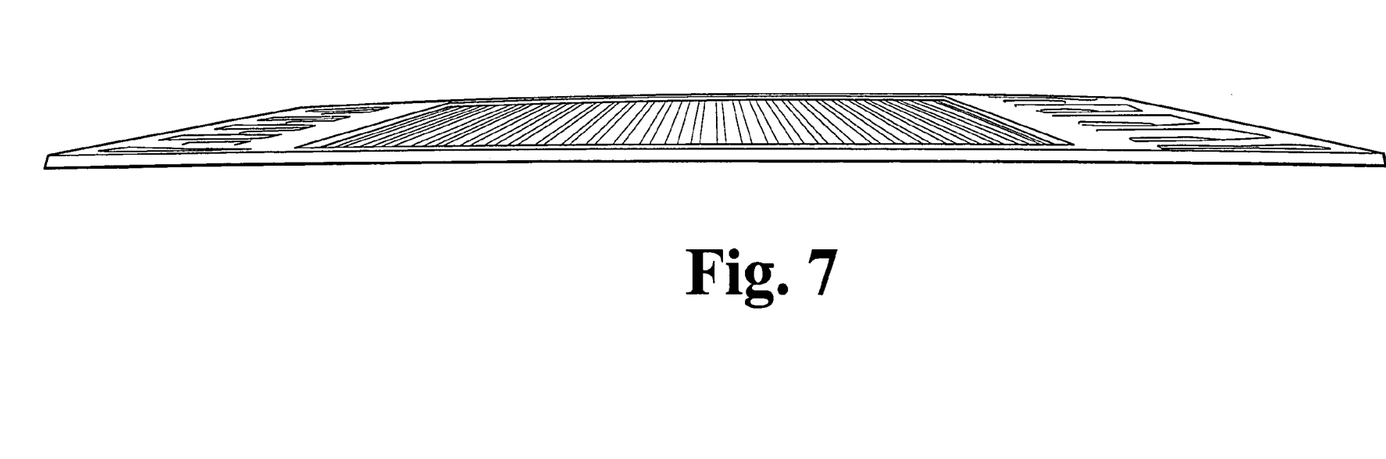
FIG. 7 is a picture of an anode-electrolyte bilayer at room temperature after sintering illustrating the reduction in camber with 1 wt % SiC in the bulk anode.
Figure 8:
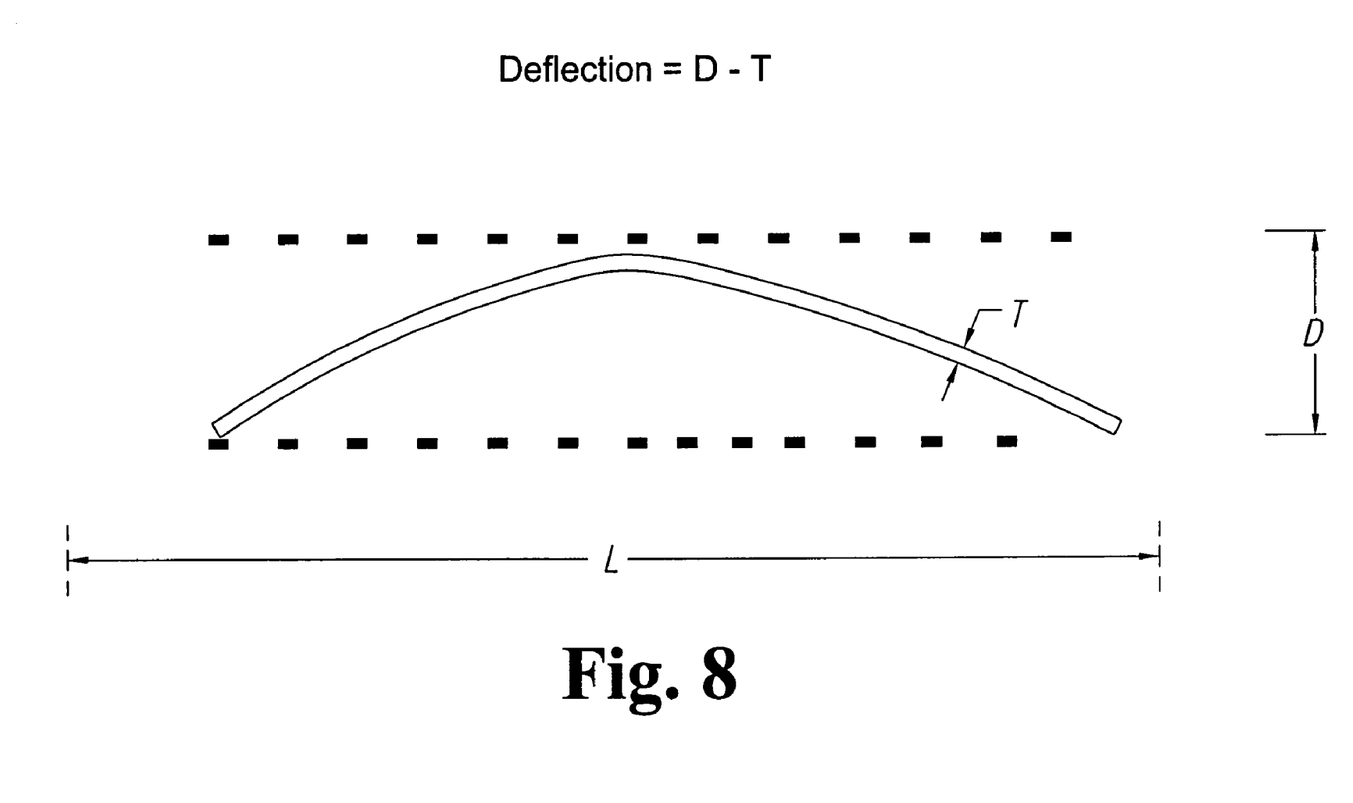
FIG. 8 is a schematic side view of a cambered planar cell illustrating the method of quantifying the amount of camber.

FIG. 7 illustrates the bilayer of FIG. 6 modified by the addition of 1 wt % SiC particles generally evenly dispersed throughout the bulk anode. Comparing FIGS. 6 and 7, one can see that this SiC addition dramatically reduces the room temperature camber. Referring to the dimensions depicted in FIG. 8, which is a side view of a cambered flat plate P, the amount of camber is quantified by the centerpoint deflection, which is the distance D between the two imaginary parallel planes contacting the opposing sides of the plate P less the and the thickness T of the plate P. It is to be understood that the deflection will tend to increase with increasing length L of the undeflected plate P. Also, because a thicker plate P will have increased structural rigidity to resist camber, the deflection will tend to decrease with increasing thickness T of the plate P. In one form of the invention, the electrolyte-anode bilayer 300 has a length L greater than about 3 cm and a thickness T less than about 750 μm and a room temperature deflection of less than about 0.05 mm per cm of length L. Preferably the deflection is less than 0.02 or less than 0.01 mm per cm of length. In other aspects, these deflection metrics are achieved for a bilayer 300 less than 600 μm thick or less than 500 μm or less than 400 μm.

A SOFC cell 100 can be formed from the anode-electrolyte bilayer 300 by any conventional method, for example by screen printing a cathode layer on the electrolyte layer followed by another sintering step. In one aspect, the formation of the cathode layer is done after the anode-electrolyte bilayer 300 has been cooled to room temperature, facilitating handling of the bilayer 300 for transport to another location or another processing operation. For example, it is contemplated that anode-electrolyte bilayers 300 may be mass produced at one location with the cathode layers applied and final SOFC formation done at another manufacturing location.

It has also been found that the addition of these small amounts of SiC to the anode composition does not adversely effect performance of the SOFC. This is surprising given the substantial difference in thermal expansion coefficients (TEC) between traditional anode compositions and bulk SiC. For example, a typical YSZ anode that is 53% NiO has a TEC of about $12.5 \times 10^{-6}/°$ C. (over the relevant range, 30-1000° C.), compared to about $5.5 \times 10^{-6}/°$ C. for SiC. This difference is significant considering the TEC for the zirconia electrolyte is about $10.5 \times 10^{-6}/°$ C. Surprisingly, despite the substantial TEC difference, the presence of the inventive amounts of SiC in the anode does not cause degradation of the anode.

In fact, it has been found that the addition of these small amounts of SiC not only do not adversely impact the performance of the cell, but in some cases actually increase the flexural strength of the bilayer, both before and after reduction and over a range of temperatures. While not intending to be bound by any theory, it is believed that the addition of SiC to the anode layer has an advantageous effect on two physical properties of the anode, its thermal expansion coefficient and its density. It is believed that the a SiC containing anode has a lower thermal expansion coefficient (TEC), bringing it closer to the TEC of the electrolyte. In addition, the SiC containing anode has an increased density, which is believed to contribute to the increased strength of the anode. Both of these changes, the lowered TEC and the increased density, are believed to each contribute to reduction of the undesirable room temperature camber.

Figure 2A:
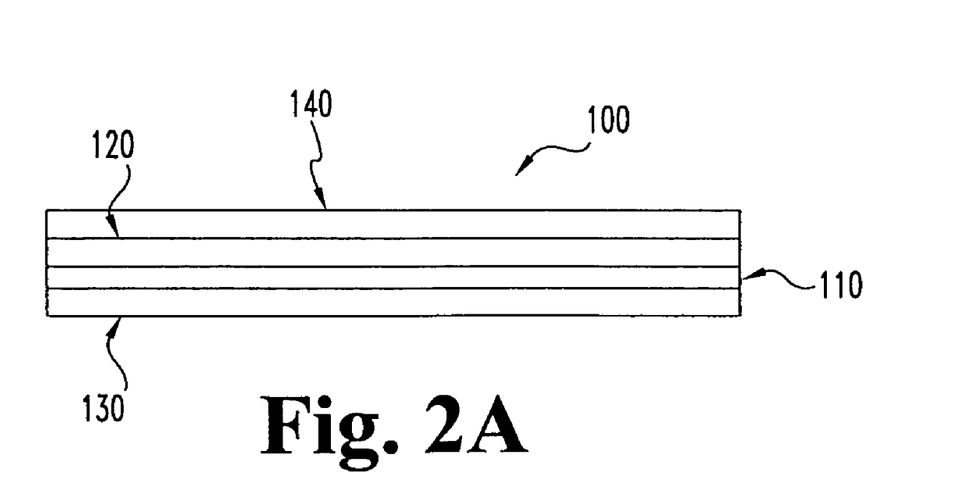
FIG. 2A is a schematic diagram of an embodiment of a fuel cell unit including an interconnect in accordance with the invention.

A fuel cell constructed in accordance with the invention can have a wide variety of configurations, including, for example and without limitation, a planar fuel cell, a tubular fuel cell or a corrugated fuel cell. As a person of ordinary skill in the art will appreciate, with respect to planar SOFC designs, multiple electrochemical cells are typically positioned adjacent one another in series to form a stack. For example, planar solid oxide fuel cell stacks typically comprise a plurality of stacked cathode-electrode-anode-interconnect repeat units with an electrical interconnect between the cathode and the anode of adjacent cells. A representative example of a cathode-electrode-anode-interconnect unit is set forth schematically in FIG. 2A, wherein interconnect 140 is positioned adjacent anode 120. The fuel cell assembly can also include ducts or manifolding to conduct the fuel and oxidant into and out of the stack. Channels for gas flow, either in a cross-flow or a co-flow or a counterflow configuration, are usually incorporated into the cathode, anode and/or interconnect. Further information pertaining to various configurations that can advantageously be used in connection with the present invention is provided in commonly owned and copending U.S. patent application Ser. No. 10/134,072 filed Apr. 26, 2002 entitled MULTI-LAYER SEAL FOR ELECTROCHEMICAL DEVICES, which is hereby incorporated herein by reference in its entirety.

With respect to tubular SOFC designs, conventional tubular SOFCs typically include an interior ceramic air electrode in the form of a porous tube. Some tubular SOFC designs also include a porous support tube on the interior of the cathode, which provides structural support for the tubular fuel cell, and also provides a substrate upon which other layers of the cell can be deposited during cell fabrication. The outer surface of the air electrode is mostly covered by a solid electrolyte material, typically made of YSZ. The outer surface of the solid electrolyte is covered by a cermet fuel electrode. In use of a tubular SOFC device, air or oxygen is caused to flow through the center of the tube and a gaseous fuel is caused to contact the anode on the outside of the tube.

It is, of course, understood that there are many design possibilities for fuel cells within these and other categories. Examples of different configurations are provided, for example, in U.S. Pat. No. 5,993,986 to Wallin et al., U.S. Pat. No. 6,106,967 to Virkar et al., U.S. Pat. No. 5,238,754 to Yasuo et al., U.S. Pat. No. 4,997,726 to Akiyama et al., U.S. Pat. No. 4,761,349 to McPhecters et al., U.S. Pat. No. 5,827,620 to Kendall, U.S. Pat. No. 6,248,468 to Ruka et al., U.S. Pat. No. 5,258,240 to Di Croce et al., U.S. Pat. No. 5,932,146 to Kuo et al. and U.S. Pat. No. 4,849,254 to Spengler et al., each of which is hereby incorporated by reference herein. It is, of course, not intended that the invention be limited to these exemplary configurations. The present invention contemplates the use in all such fuel cell configurations now known or later developed, without limitation to particulars of the design. In a preferred embodiment, the fuel cell is a planar fuel cell.

Figure 3:
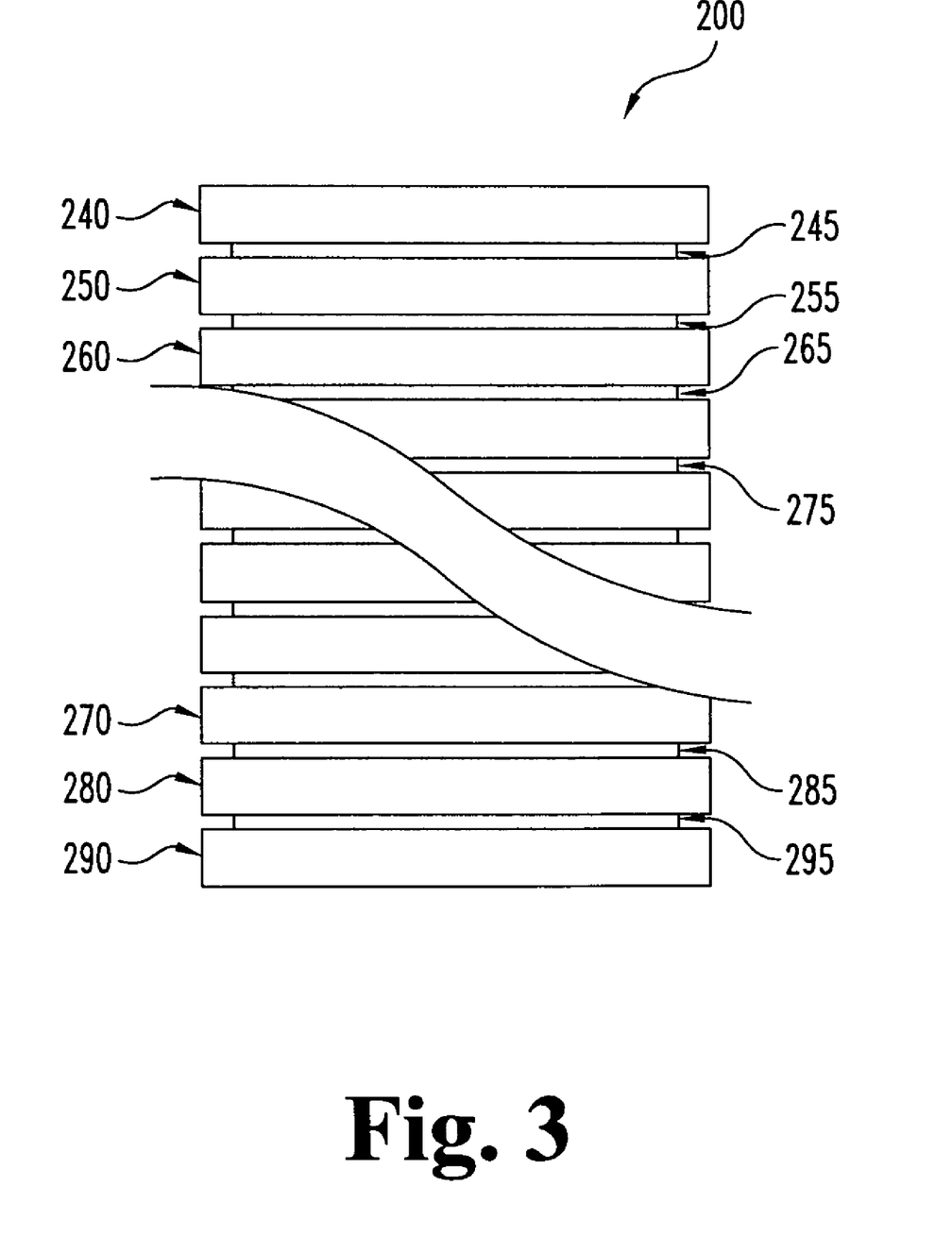
FIG. 3 is a schematic diagram of an embodiment of an electrochemical device of the invention.

In one aspect of the invention, depicted schematically in FIG. 3, an inventive fuel cell is incorporated in a fuel cell assembly 200 that includes a plurality of solid oxide fuel cells 240, 250, 260, 270, 280, 290. The individual cells are separated by seals 245, 255, 265, 275, 285, 295 and potentially one or more additional structures (not shown), such as, for example, conductive interconnects, gas flow components and the like. In a variation, the seals 245, 255, 265, 275, 285, 295 are omitted. One embodiment of the invention is a solid oxide fuel cell assembly for electrochemically reacting a fuel gas with a flowing oxidant gas at an elevated temperature to produce a DC output voltage, the assembly including a plurality of integral fuel cell units 240, 250, 260, 270, 280, 290, wherein each unit comprises a layer of ceramic ion conducting electrolyte disposed between and in contact with a conductive anode layer and a conductive cathode layer as described above, and wherein at least one unit includes a supporting anode layer as described herein. The assembly also preferably includes a system for passing a gaseous fuel in contact with said anode layers and passing an oxidizing gas in contact with said cathode layers (not shown); and a system for utilizing electrical energy produced by said fuel cells (not shown).

An alternative method for preventing or inhibiting the development of camber is to introduce a degree of symmetry to the anode-electrolyte bilayer by providing a backing layer of material having a TEC close to the TEC of the electrolyte layer on at least a portion of the back side of the anode. This technique can be applied in combination with or in place of the addition of SiC to the anode layer described above.

Figure 9:
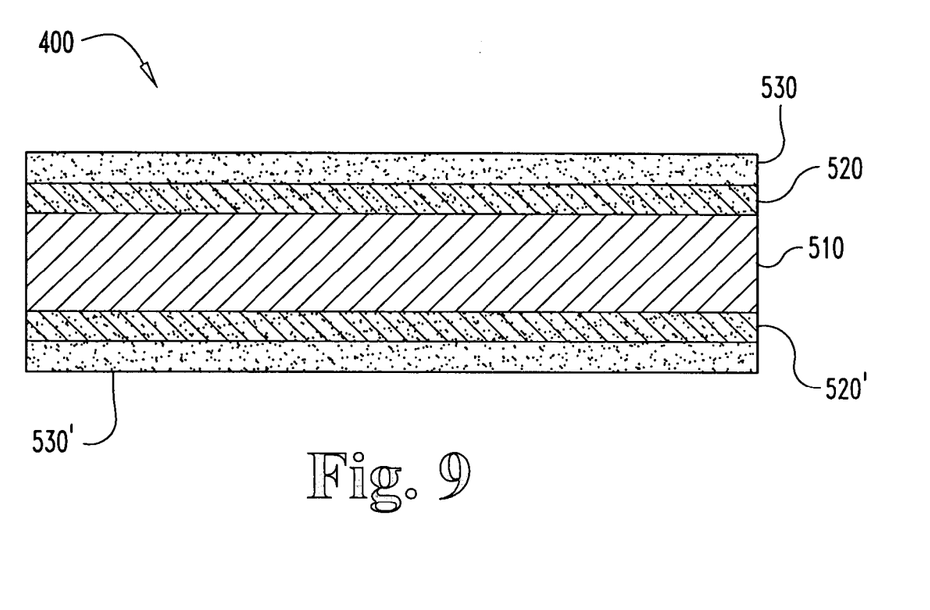
FIG. 9 is a side schematic view of a planar anode-electrolyte bilayer for use in an alternative embodiment.

In one aspect of this variation, an anode-electrolyte bilayer 400, like bilayer 300 described above, has an electrolyte layer 530 over an active anode layer 520 supported on a bulk anode layer 510. However, unlike bilayer 300, bilayer 400 includes additional layers 520' and 530' on the backside of the bulk anode layer 510. As illustrated in FIG. 9, backside layers 520' and 530' are provided on the backside as generally mirror images of the layers 520 and 530 on the front side, in terms of composition and thickness. The purpose of these additional layers 520' and 530' is to counteract the tendency to camber caused by the TEC mismatch on the frontside by providing symmetric stresses to the backside of the bulk anode layer 510 during cooling of the bilayer and during thermal cycling of the finished SOFC.

However, while a mirror image is a suitable configuration, perfect symmetry is not necessary. The backside layers 520' and 530' can be merely similar to the front side layers 520, 530, in terms of thickness, composition, and TEC. For example, the thickness of layers 530 and 530' are preferably within about 50% of each other, for example within about 25% or about 10%, with either layer being thicker than the other. Likewise, the TECs of the frontside and backside layers are preferably within about 20% or within about 10% of each other. Further, it is not necessary to form the backside layers 530', 520' of uniform thickness, and in fact, as described more fully below, a non-uniform backside layer is ultimately preferred. The backside layer can be any material with the desired TEC, such as a YSZ when a YSZ is used as the electrolyte. The backside layer can optionally include SiC in the manner described above.

Moreover, since the primary contribution to the room temperature camber is believed to be the presence of the electrolyte layer 530 and the TEC mismatch with the TEC of the bulk anode layer 510, in another variation only an electrolyte backing layer is provided 530'.

Figure 10:
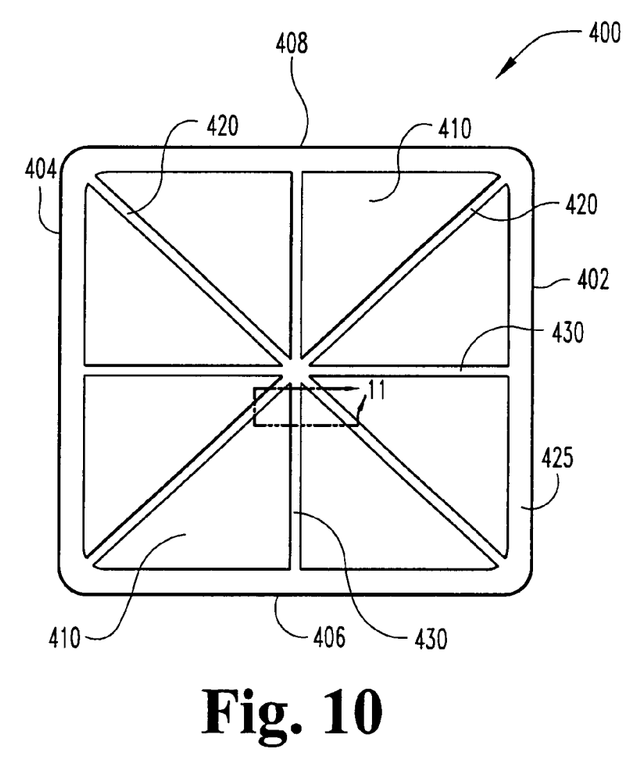
FIG. 10 is a view of the back side of a the FIG. 9 bilayer patterned according to another embodiment of the invention.
Figure 11:
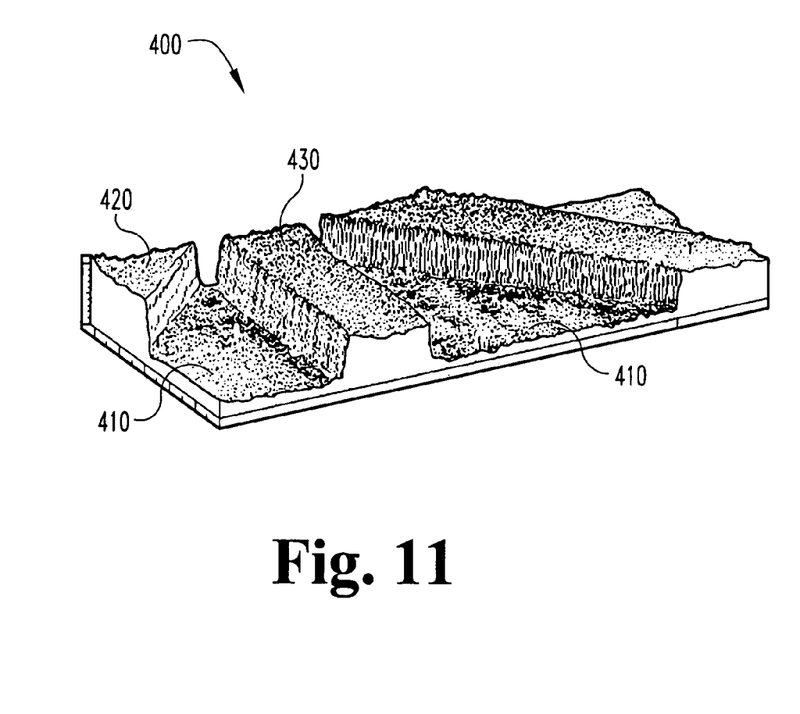
FIG. 11 is an enlarged perspective view of the dotted section of FIG. 9 showing details of the pattern.

The presence of the backing layer(s) 520', 530' serves to facilitate construction of an anode supported fuel cell, but they may hinder actual performance of the fuel cell if they cover the entire backside of the bilayer 400, for example by hindering diffusion of fuel to the active anode 520. Turning now to FIGS. 10 and 11, in another aspect, the backing layers are only present in a predetermined pattern on the backside of the bilayer 400.

Bilayer 400 is generally rectangular and has sections 410 of exposed bulk anode separated by strips 420, 430 of the backing layer covering the bulk anode. The backing layer also covers the bulk anode around the perimeter 425 of the bilayer 400. Strips 420, 430 are elongated and generally of uniform width, with strips 420 aligned along the diagonals and strips 430 spanning between the midpoints of the opposing sides 408, 406 and 402, 404. Accordingly, strips 420, 430 form a star pattern with eight arms extending symmetrically from a midpoint of the bilayer 400. The relative width of the strips 430, 420 is selected to be about 3% of the length of a side 408, 404 such that over 40% of the cross section area of the backside of the bilayer 400 is exposed bulk anode. Preferably the exposed bulk anode is over 50%, more preferable over 75%, and most preferably over 90% of the cross sectional area.

The pattern of backing strips 420, 430 and exposed bulk anode sections 410 can be formed by removing sections of the backing layers 530' and 520' of the bilayer 400 of FIG. 9. The removal can be by laser cutting, etching, or other suitable technique. Alternatively, the backing strips may be applied prior to co-sintering of anode-electrolyte layers by similar methods previously described for the electrolyte fabrication.

Figure 12:
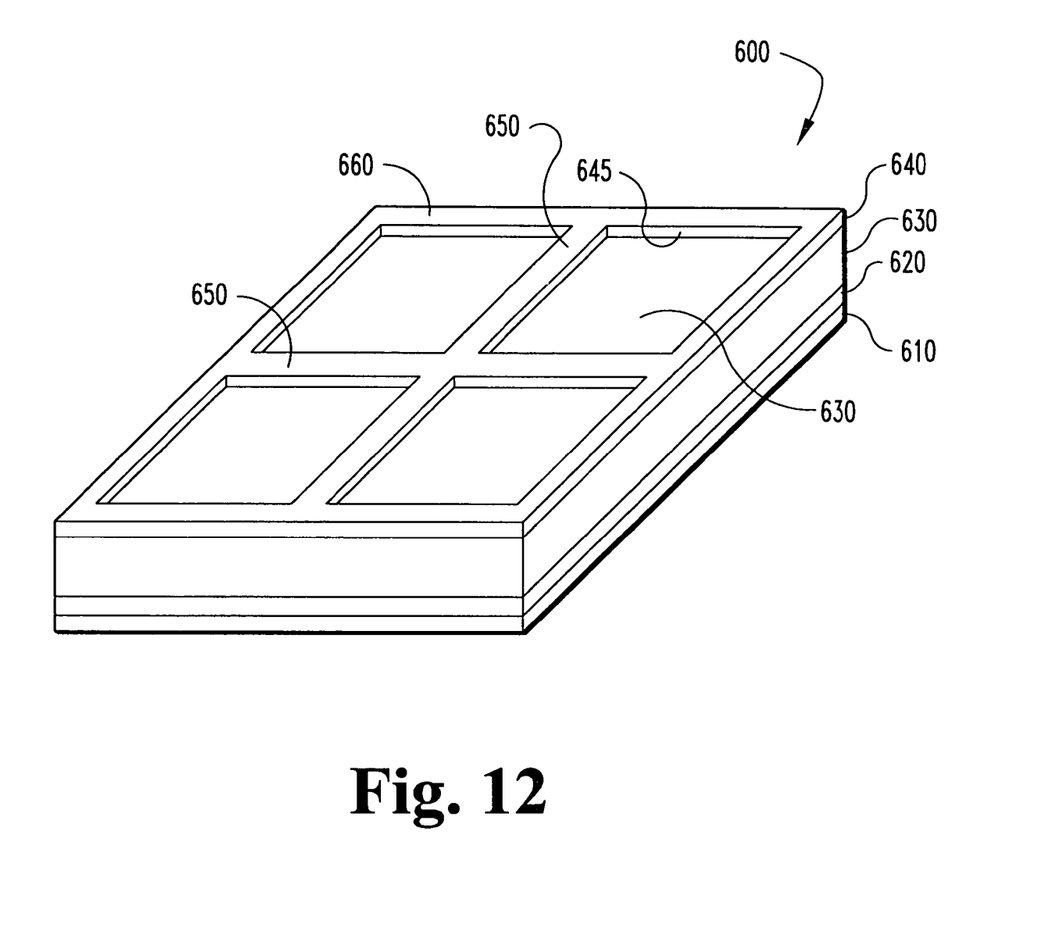
FIG. 12 is a back perspective view of a fuel cell having a patterned backing layer according to another embodiment.

Turning now to FIG. 12 a SOFC cell 600 having a patterned backing layer providing stability against camber is depicted. Cell 600 is an planar anode supported cell having an anode layer 630, an electrolyte layer 620, and a cathode layer 610 operably associated to form an electrochemical cell when implemented with the gas flow channels and electrical connections (not shown) know in the art. Cell 600 can be formed in the manner described above, wherein the anode and electrolyte layers are co-sintered and then the cathode layer 610 is applied in a separate step, such as by screen printing. A backing layer 640 is formed on the back face of the anode layer 630. This backing layer 640 is in a pattern that includes a perimeter 660 and a pair of strips 650 spanning the length dimensions of the cell 600. The pattern does not cover the entire back side of the anode layer 630 but defines several through openings 645 to the anode layer 630.

It is to be understood that while the illustrated cells are rectangular, a patterned backing layer or structure according to the present invention can be used to stabilize an electrochemical cell or an electrode supported electrolyte of any shape, including circular cells. Further, the pattern of the backing layer need not originate in the center of the cell or at any particular location on the back face of the cell. A grid pattern, either parallel or at an angle to the sides, for example at a 45° orientation, are expressly contemplated. Moreover, while the backing layer depicted in the figures are in a pattern having a degree of symmetry, deviations from perfect symmetry can be employed as would occur to those of skill in the art. Particularly where there is a degree of irregularity in the shape of the cell or membrane, an irregular backing pattern might be preferable.

Finally, while certain of the illustrated embodiments utilize the backing layer to support an anode supported electrolyte, the backing layer can be applied to the back of the cathode layer. A particular contemplated application is in the context of a cathode supported electrolyte and would be implemented in similar fashion as described above for an anode supported cell, by providing a backing layer on a cathode substrate. In addition, a patterned backing layer can be utilized on both the anode and the cathode layers for either an anode supported or a cathode supported cell.

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with reference to an electronic device, it should be understood to comprehend singular or plural and one or more signal channels as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. An electrode supported electrolyte membrane for an electrochemical cell comprising:
   a substantially continuous layer of a ceramic ion conducting electrolyte supported on a conductive electrode substrate, wherein the conductive electrode substrate is planar and has a thickness less than about 750 µm and includes an active electrode layer and a bulk electrode layer;
   a backing structure on a face of the bulk electrode layer opposite the electrolyte layer and composed of a material having a thermal expansion coefficient about equal to the terminal expansion coefficient of the ceramic ion conducting electrolyte;
   wherein the backing structure has a thickness cross-section, and includes at least one void extending completely through the thickness cross-section of the backing structures wherein the at least one void is arranged in a two-dimensional pattern such that the backing structure covers less than about 50% of the area of the face of the bulk electrode layer and is effective to prevent deflection of more than about 0.05 mm/cm of length of the bulk electrode layer upon a temperature change from 1000° C. and 100° C. and wherein the pattern includes elongated strips spanning substantially completely across the face of the substrate.

2. The electrode supported electrolyte membrane of claim 1 wherein the backing structure covers less than about 25% of the area of the face of the substrate.

3. The electrode supported electrolyte membrane of claim 1 wherein the electrode is an anode containing between about 30% to 70% Ni by volume and the electrolyte is YSZ.

4. The electrode supported electrolyte membrane of claim 3 in combination with a cathode layer to form a solid oxide fuel cell.

5. The electrode supported electrolyte membrane of claim 1 wherein the pattern includes a substantially continuous perimeter around at least a portion of the face of the substrate.

6. The electrode supported electrolyte membrane of claim 1 wherein the pattern includes intersecting thin strips.

7. The electrode supported electrolyte membrane of claim 1 wherein the membrane is generally rectangular in outer dimension and the pattern includes a plurality of elongated strips spanning between opposed sides of the rectangle.

8. The electrode supported electrolyte membrane of claim 7 wherein the strips span at least one diagonal of the rectangle.

9. A planar solid oxide fuel cell for electrochemically reacting a fuel gas with an oxidant gas to produce a DC output voltage, said solid oxide fuel cell comprising:
   (a) at least one fuel cell unit comprising:
      a layer of a ceramic ion conducting electrolyte defining first and second opposing surfaces;
      a conductive active anode layer defining first and second opposing surfaces, wherein the first surface of the active anode layer is facing the first surface of the electrolyte layer;
      a conductive bulk anode layer defining first and second opposing surfaces, wherein the first surface of the conductive bulk anode layer is facing the second surface of the active anode layer;
      a conductive cathode layer facing the second surface of the electrolyte layer; and
      a backing layer facing the second surface of the conductive bulk anode layer;
      wherein the backing layer is of a material having a thermal expansion coefficient about equal to the thermal expansion coefficient of the ceramic ion conducting electrolyte, wherein the backing layer has a thickness cross-section, and includes at least one void extending completely through the thickness cross-section of the backing layer wherein the at least one void is arranged in a two-dimensional pattern such that the backing layer covers less than about 50% of the area of the second surface of the conductive bulk anode layer and wherein the pattern includes elongated strips spanning substantially completely across the surface of the conductive bulk anode layer; and
   (b) at least one interconnect coupled to the fuel cell unit.

10. The fuel cell of claim 9 wherein the backing layer is formed in a two dimensional pattern that has at least one line of symmetry.

11. The fuel cell of claim 9 wherein the backing layer includes the ceramic ion conduction electrolyte.

12. The fuel cell of claim 11 wherein the ceramic ion conducting electrolyte is YSZ.

13. The fuel cell of claim 9 wherein the layer of electrolyte has a thickness less than about 15 µm.

14. The fuel cell of claim 9 wherein the combined thickness of the conductive active anode layer and the conductive bulk anode layer is less than about 750 µm.

15. The fuel cell of claim 14 wherein the combined thickness of the active anode layer, the bulk anode layer, the cathode layer, and the electrolyte layer is less than about 600 µm.

16. The fuel cell of claim 10 constructed by co-sintering the conductive active and bulk anode layers and the ceramic ion conducting electrolyte layer to form an anode-electrolyte bilayer and allowing the anode electrolyte bilayer to cool to a temperature below about 100° C. before providing the conductive cathode layer facing the second surface of the electrolyte layer.

17. An anode supported electrolyte membrane which resists developing thermally induced camber comprising:
    a planar layer of a ceramic ion conducting electrolyte having a length greater than about 3 cm and a thickness less than about 15 µm supported by a planar anode layer having a thickness less than about 750 µm; and
    a backing structure on a back face of the anode layer opposite the electrolyte layer and composed of a material having a thermal expansion coefficient about equal to the thermal expansion coefficient of the ceramic ion conducting electrolyte, wherein the backing structure is not an interconnect, wherein the backing structure has a thickness cross-section, and includes at least one void extending completely through the thickness cross-section of the backing structure, wherein the at least one void is arranged in a two-dimensional pattern, and wherein the pattern includes elongated strips spanning substantially completely across the face of the anode layer.

18. The anode supported electrolyte membrane of claim 17 wherein the backing structure covers less than 60% of the back face of the anode layer.

19. The anode supported electrolyte membrane of claim 18 wherein the backing structure includes YSZ.

20. The anode supported electrolyte membrane of claim 19 constructed by initially covering substantially all of the back face of the anode layer with the backing structure and then removing portions of the backing structure to expose the back face of the anode layer.

21. The anode supported electrolyte membrane of claim 17 wherein the backing structure includes SiC.

22. The fuel cell of claim 9, wherein the fuel cell comprises more than one fuel cell unit, and the interconnect is disposed between adjacent fuel cell units.

23. The fuel cell of claim 9, wherein the backing layer has a thickness cross-section and includes at least one void extending completely through the thickness cross-section.

24. An electrode supported electrolyte membrane for an electrochemical cell comprising:
- a substantially continuous layer of a ceramic ion conducting electrolyte supported on a conductive electrode substrate, wherein the conductive electrode substrate is planar and has a thickness less than about 750 µm and includes an active electrode layer and a bulk electrode layer;
- a backing structure on a face of the bulk electrode layer opposite the electrolyte layer and composed of a material having a thermal expansion coefficient about equal to the terminal expansion coefficient of the ceramic ion conducting electrolyte;
- wherein the backing structure has a thickness cross-section, and includes at least one void extending completely through the thickness cross-section of the backing structure, wherein the at least one void is arranged in a two-dimensional pattern such that the backing structure covers less than about 50% of the area of the face of the bulk electrode layer and is effective to prevent deflection of more than about 0.05 mm/cm of length of the bulk electrode layer upon a temperature change from 1000° C. and 100° C., wherein the pattern includes intersecting thin strips.

25. An electrode supported electrolyte membrane for an electrochemical cell, wherein the membrane is generally rectangular in outer dimension, comprising:
- a substantially continuous layer of a ceramic ion conducting electrolyte supported on a conductive electrode substrate, wherein the conductive electrode substrate is planar and has a thickness less than about 750 µm and includes an active electrode layer and a bulk electrode layer;
- a backing structure on a face of the bulk electrode layer opposite the electrolyte layer and composed of a material having a thermal expansion coefficient about equal to the terminal expansion coefficient of the ceramic ion conducting electrolyte;
- wherein the backing structure has a thickness cross-section, and includes at least one void extending completely through the thickness cross-section of the backing structure, wherein the at least one void is arranged in a two-dimensional pattern such that the backing structure covers less than about 50% of the area of the face of the bulk electrode layer and is effective to prevent deflection of more than about 0.05 mm/cm of length of the bulk electrode layer upon a temperature change from 1000° C. and 100° C. and wherein the pattern includes a plurality of elongated strips spanning substantially between opposed edges of the rectangular membrane.

26. The electrode supported electrolyte membrane of claim 25 wherein the strips span at least one diagonal of the rectangular membrane.

* * * * *